United States Patent
M

(10) Patent No.: US 8,346,056 B2
(45) Date of Patent: Jan. 1, 2013

(54) GRAPHICAL BOOKMARKING OF VIDEO DATA WITH USER INPUTS IN VIDEO SURVEILLANCE

(75) Inventor: Deepak Sundar M, Bangalore (IN)

(73) Assignee: Honeywell International Inc., Morristown, NJ (US)

(*) Notice: Subject to any disclaimer, the term of this patent is extended or adjusted under 35 U.S.C. 154(b) by 201 days.

(21) Appl. No.: 12/904,430

(22) Filed: Oct. 14, 2010

(65) Prior Publication Data

US 2012/0093477 A1    Apr. 19, 2012

(51) Int. Cl.
*H04N 9/80* (2006.01)
(52) U.S. Cl. .................................. 386/241; 386/248
(58) Field of Classification Search .............. 386/241, 386/248

See application file for complete search history.

(56) References Cited

U.S. PATENT DOCUMENTS

| 5,751,345 A | 5/1998 | Dozier et al. | |
| 2005/0025235 A1* | 2/2005 | Hoang et al. | 375/240.01 |
| 2009/0172554 A1* | 7/2009 | Subbian et al. | 715/733 |
| 2009/0225163 A1* | 9/2009 | Chathukutty et al. | 348/143 |
| 2010/0281373 A1* | 11/2010 | Pueyo et al. | 715/723 |

FOREIGN PATENT DOCUMENTS

WO    WO 2006/107430 A1    10/2006

OTHER PUBLICATIONS

European Search Report corresponding to Application No. EP 11 18 4932 dated Feb. 15, 2012.

* cited by examiner

*Primary Examiner* — Thai Tran
*Assistant Examiner* — William Tran
(74) *Attorney, Agent, or Firm* — Husch Blackwell

(57) ABSTRACT

A method and apparatus are provided for processing video. The method includes the steps of a security system providing video of a secured area, a security person monitoring the provided video, the security person superimposing markings onto one or more frames of the monitored video through a display of the monitored video and the security system saving one or more video frames and markings within a set of respective files of a memory device where the video frames occupy a first file of the set of respective files and the markings occupy a second file of the set of files, where the first and second files are different and where the markings are related to the corresponding one or more video frames via a cross reference.

24 Claims, 7 Drawing Sheets

GRAPHICAL BOOKMARKING OF VIDEO DATA WITH USER INPUTS IN VIDEO SURVEILLANCE

FIELD OF THE INVENTION

The field of the invention relates to security systems and more particularly video monitoring of secured areas.

BACKGROUND OF THE INVENTION

Security systems are generally known. Such systems typically include a physical barrier (e.g., walls, doors, etc.) that define and protect a secured area and number of sensors placed around a periphery or within the secured area to detect intruders. The sensors may include one or more switches placed on doors or windows. The sensors may also include passive infrared (PIR) detectors, motion detectors and a number of security cameras.

The security cameras may be monitored either locally or remotely for intruders. Alternatively, a video stream from each of the video cameras may be analyzed by a computer processor on a frame-by-frame basis to detect the motion of an intruder based upon differences between successive frames.

The sensors of a security system are typically connected to a common control panel. The control panel may be arm or disarmed by an occupant through a user interface on the control panel. Once armed, the control panel may monitor each of the sensors. Upon activation of an intrusion sensor, the control panel may activate a local alarm and/or send an alarm signal to a central monitoring station.

While such systems work well, they are often not as effective as they could be. For example, some areas of a secured space are normally occupied by people in the ordinary course of use of the secured space. While a computer processor is able to process successive images to detect at least some abnormal events, there are also events that the computer processor cannot detect. Accordingly, a need exists for methods of processing video that accommodates the ability to detect and record the possibility of suspicious activity.

DETAILED DESCRIPTION OF AN ILLUSTRATED EMBODIMENT

Figure 1:
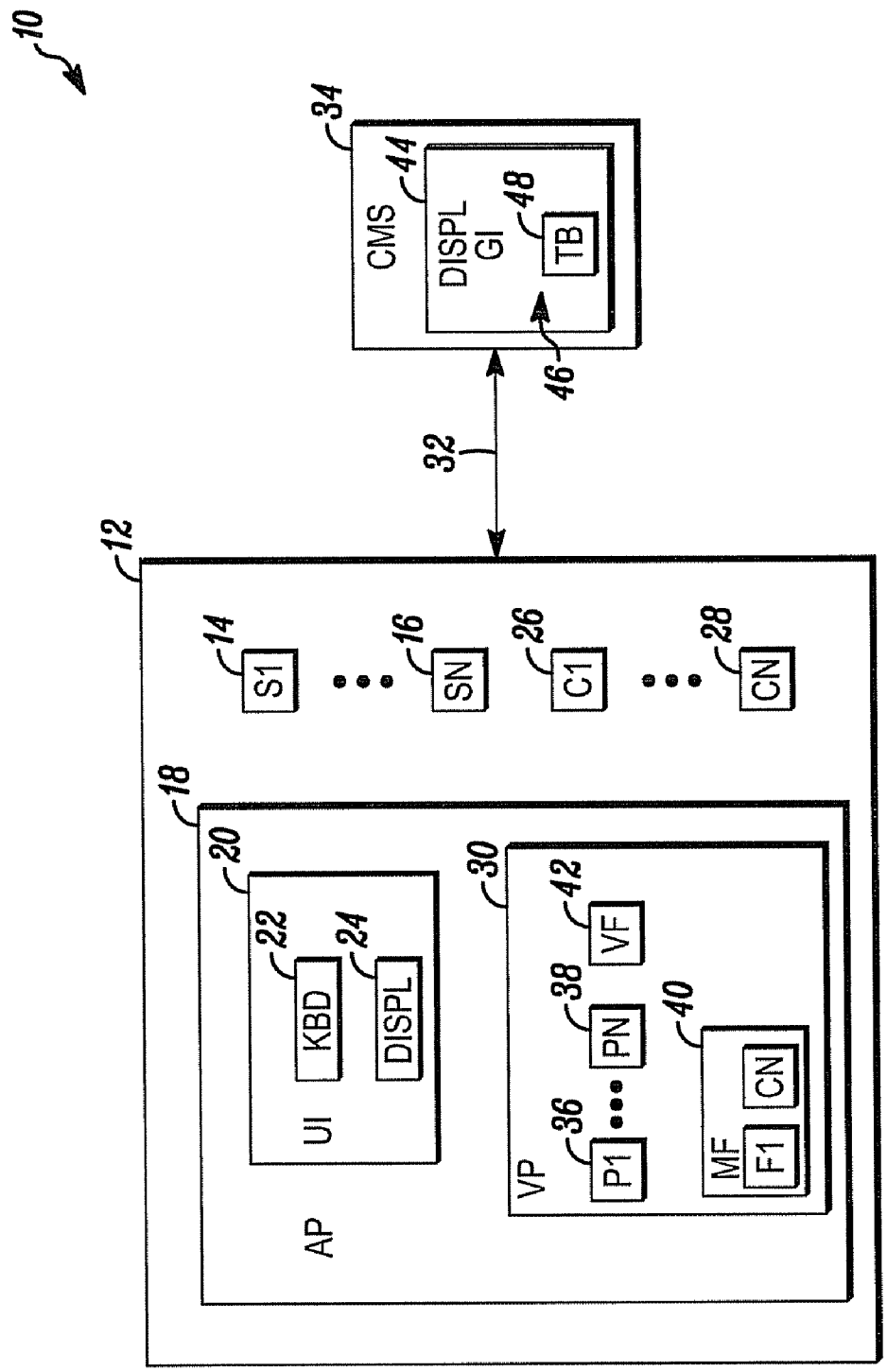
FIG. 1 depicts a security system with video monitoring shown generally in accordance with an illustrated embodiment of the invention.

FIG. 1 depicts a security system 10 shown generally in accordance with an illustrated embodiment of the invention. Included within the alarm system 10 may be a number of sensor devices (sensors) 14, 16 that detect unauthorized access of a secured area 12. Also included may be an alarm panel 18 that detects activation of the sensors 14, 16.

Also associated with the alarm panel 18 may be a user interface 20. The user interface 20 may include a keyboard 22 and a display 24 through which the user may arm and disarm the system 10.

Included within the system 10 may be a number of video monitoring devices (e.g., cameras) 26, 28. The video monitoring devices 26, 28 may, in turn, be connected to a video processor 30.

Within the video processor 30, video from the monitoring devices 26, 28 may be processed to detect security breaches. For example, at least some of the monitoring devices 26, 28 may be used to detect movement within a field of view and, in response, to send notification to the alarm panel 18 in response to such movement. Alternatively, at least some areas within a field of view of a monitoring device 26, 28 may be designated as an exclusion zone where entry of a person into the exclusion zone may trigger an alarm or other alert.

When armed, the alarm panel 18 may monitor the sensors 14, 16 and monitoring devices for triggering events. A triggering event means activation of a sensor 14, 16 or the detection of an intruder by video processor 30 based upon video from one of the monitoring devices 26, 28. Upon receipt of notification of a triggering event from one of the devices 14, 16, 26, 28, the alarm panel 18 may activate a local annunciator that alerts authorized users of the protected area 12 to the intrusion. In addition, the alarm panel 18 may send an alarm message 32 to a central monitoring station 34. In response to the alarm message 32, the central monitoring station may dispatch the police or private security personnel.

In addition to processing events from the sensors 16, 18 and monitoring devices 26, 28, the alarm panel 18 and video processor 30 may also provide video from the monitoring devices 26, 28 to one or more displays 24. The one or more displays 24 may directly viewed in real time by security personnel either locally or through the central monitoring station 34.

Security personnel may monitor the video of the security system 10 received from the monitoring devices 26, 28 in real time on the displays 12 at the same time that the video is saved into a video file 42. As is know to those of skill in the art, direct monitoring of real time video may be necessary to detect some forms of criminal activity. For example (and as would be well known to those of skill in the art), a human observer is much more adept at detecting suspicions activity than any computer processor could be.

For example, prior art automated methods of video analytics for detecting criminal/suspicious activity are limited by the assumption used in creating the algorithm as well as the parameters upon which the assumptions are based. Even where the assumptions are based upon valid reasons, the configuration, tolerance levels and threshold levels used in implementing the algorithm may still fail to produce the desired result. The use of a human CCTV operator to review and mark video avoids these pitfalls because the mind of the human CCTV operator is far more adaptable than current methods.

Under illustrated embodiments, a marking feature within the security system 10 allows security personnel to mark up the frames of the video for further real time review by other security personnel or for evidentiary purposes. In this regard, one or more sub processors 36, 38 within the video processor 30 may monitor and record input from security personnel and save the input in a mark up file that is separate from the image file 42 of the video being marked up. For example, a first screen monitoring processor may monitor the display 12 for marking inputs from the person monitoring the display. In this regard, the screen monitoring processor may detect (via changes in capacitance or resistance) the person making contact with a surface of the display. The contact may be made by the person using his/her finger or, alternatively, a stylus may be used in making contact. When the screen monitoring processor detects such a change in capacitance or resistance, the screen monitoring processor may send notification to a file processor 36, 38. In response, the file processor may immediately open a video markings file 40 in memory and begin saving a set of coordinates of a location of the contact. In addition to saving the coordinates of the contact, the file processor may also store frame identifiers (e.g., time of the contact and an identifier of the monitoring device 26, 28). The frame identifier allows any markings saved into the file to be displayed in conjunction with the associated one or more frames. Once a mark is made into a markings file 40, that mark continues to be displayed in subsequent frames until the person (who added the marking) activates a reset button.

It should be noted that the markings file 40 is separate from the video file 42. This allows the markings to be structured in the form of a virtual glass layer that can be superimposed onto the video at the appropriate location where the person marked up the display 12, but does not change the underlying video file. This is important because if it turns out that the suspicious activity is of an innocent nature, the markings (and markings file 40) can be deleted without any impact on the underlying video.

Also operating in the background within the video processor 30 may be a markings display processor 36, 38. The display processor 36, 38 reads the markings file 40, correlates the markings file 40 with the underlying video frames and displays the markings superimposed on the one or more video frames.

The video processor 30 may also stream video from the monitoring devices 26, 28 and the contents of any associated markings file 40 substantially in real time. This allows other (e.g., supervisory) personnel to view the same video frames via another display 44 as the person who first noticed the suspicious activity. For example, a security person whose primary responsibility is monitoring video (i.e., primary viewer or CCTV operator) may notice suspicions activity on a video display from one of the devices 26, 28 and may draw a circle around the suspicious activity on a portion of the display 12. The primary person may call his/her supervisor and alert the supervisor to the suspicious activity. The supervisor can select the video from the device 26, 28 on his/her display 44. Since the markings information from the file 40 is streamed simultaneously along with the source video from the device 26, 28, the supervisor is also presented with the markings added to the video by the primary CCTV operator.

Moreover, there may be a number of marking files 40 associated with a particular portion (i.e., one or more frames) of video. For example, if the supervisor should touch his/her screen, then a file processor 36 may immediately open another markings file 40 for the supervisor. Alternatively, the supervisor may activate a combine key and the markings added by the supervisor may be combined with the markings from the primary CCTV operator into a single file 40.

In general, the markings provided as graphical information through the marking processor may be provided under any of a number of formats (e.g., geometric shapes, lines, arrow marks, curves, text information, etc.). When the markings are to be provided as text, the user may simply place the stylus on the display 24 and activate a text softkey on the display 24 or on an associated keyboard. In response, the marking processor may create a text box 48 and receive information from a keyboard associated with the display. The use of a text box 48 allows the user to enter text describing the reason for the marking or why the marked area 46 is suspicious.

Figure 2:
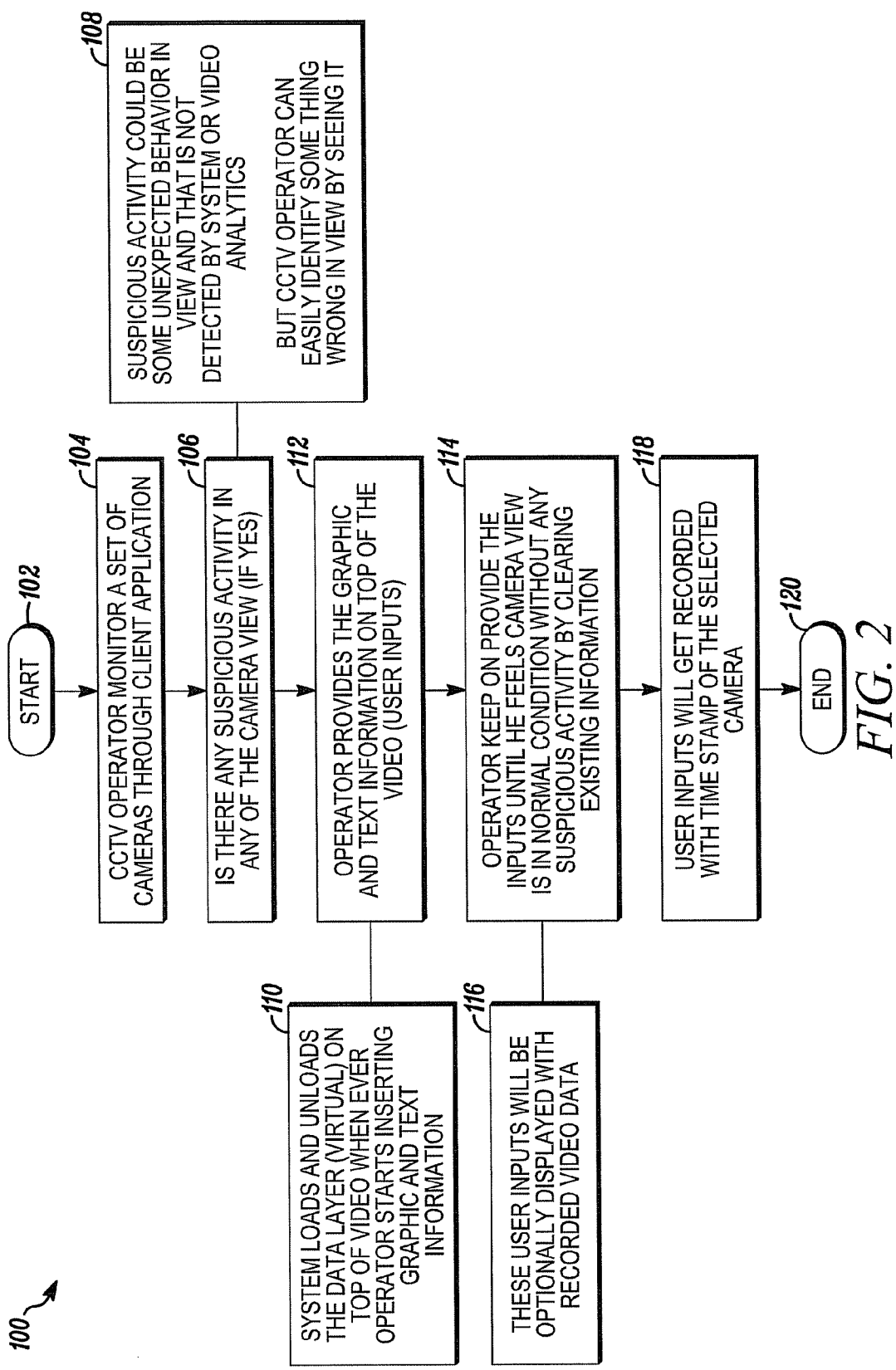
FIG. 2 is a flow chart of method steps that may be used by the video monitoring system of FIG. 1.

FIGS. 3-7 depict an example of the use of the system 10. FIG. 2 is a flow chart that depicts the steps associated with the example.

Figure 3:
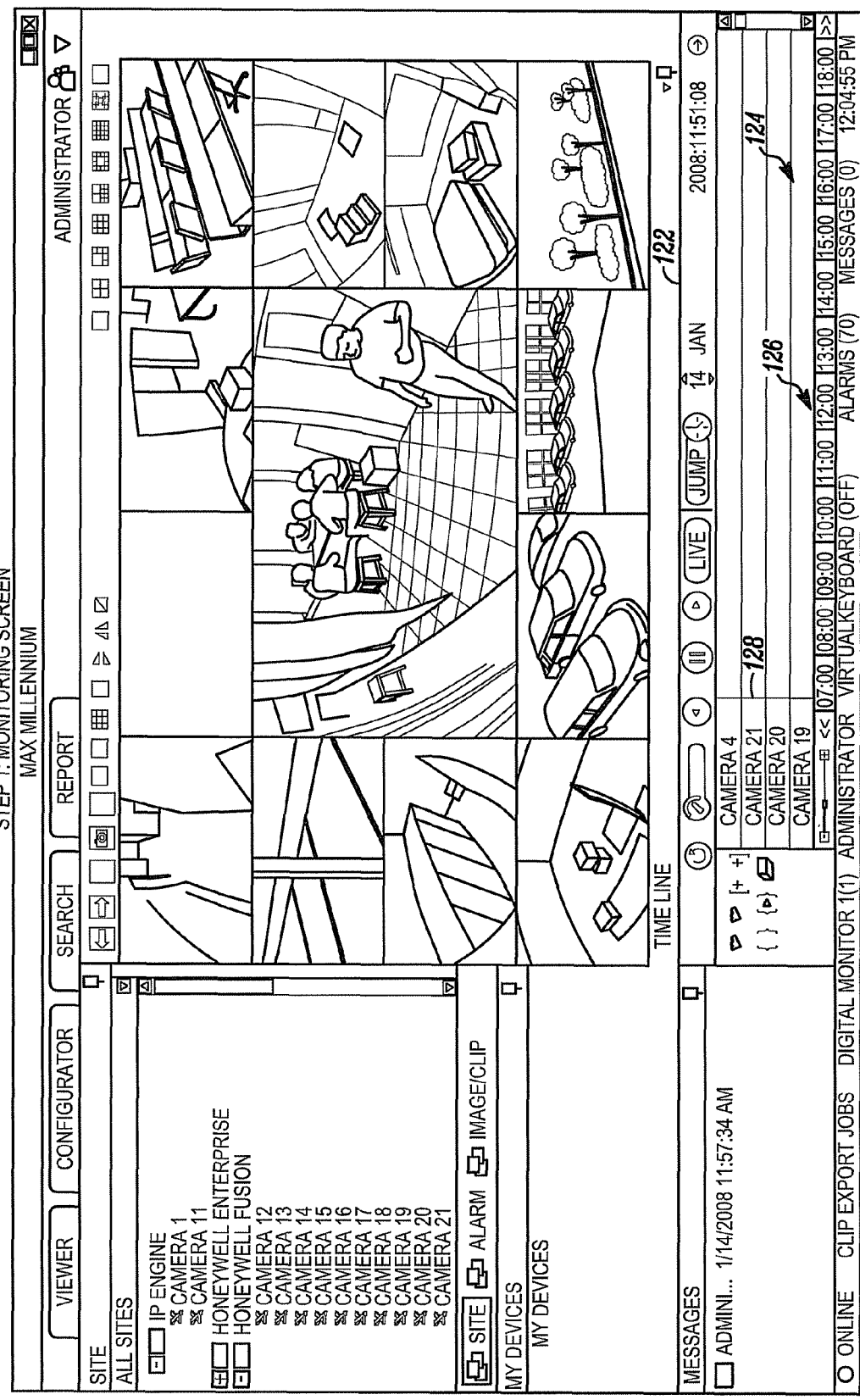
FIG. 3 depicts a number of video windows and softkey control panel that may be used by the system of FIG. 1.
Figure 4:
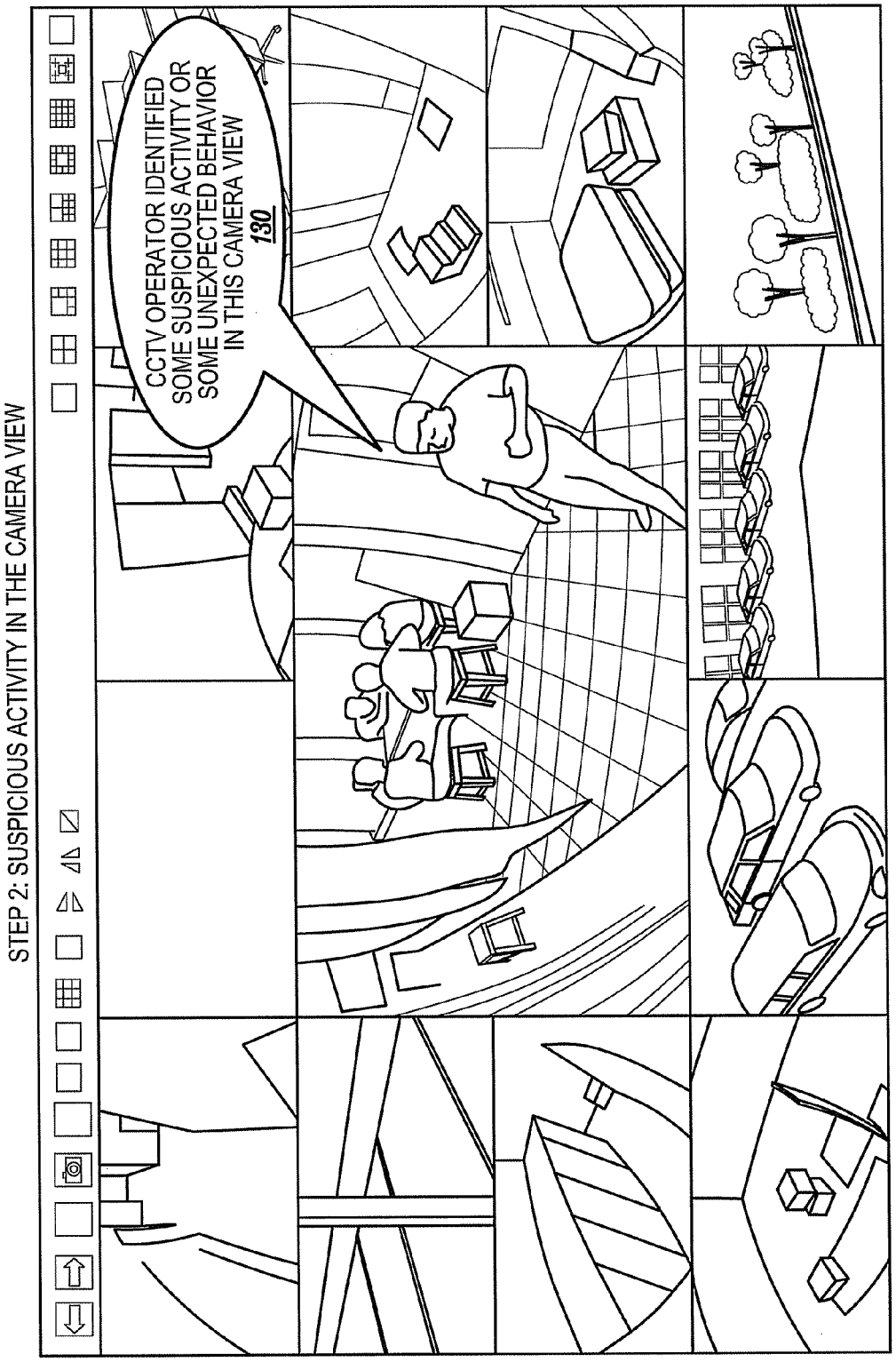
FIG. 4 depicts a primary CCTV operator reviewing video for suspicious activity using the system of FIG. 1.

As shown in FIGS. 2 and 3, a primary viewer (CCTV operator) may begin 102 by monitoring 104 a set of cameras through client applications 30, 36, 38. In this case, video from a number of monitoring devices 26, 28 may be simultaneously displayed in a respective number of video windows on the display 24. Provided along a bottom of the display 24 is a softkey control panel 122 for the display 24. The CCTV operator has activated a softkey 128 to select camera 21 to display video in a center of the display 24.

Shown along the bottom of the control panel is a selectable time line 124 for selecting a time instant for displayed video frames. An indicator 126 depicts the selected time period that is currently being displayed. When real time video is being displayed, the indicator 126 simply indicates a current time.

When viewing the video, the CCTV operator may continuously review the video for any indication of suspicious activity 106 within the images. In this case, suspicious behavior could be some unexpected behavior 108 that is not detected by the video processor 30. Upon occasion, the CCTV operator may identify suspicious behavior in one of the video windows as indicated by the balloon labeled 130 in FIG. 4.

Figure 5:
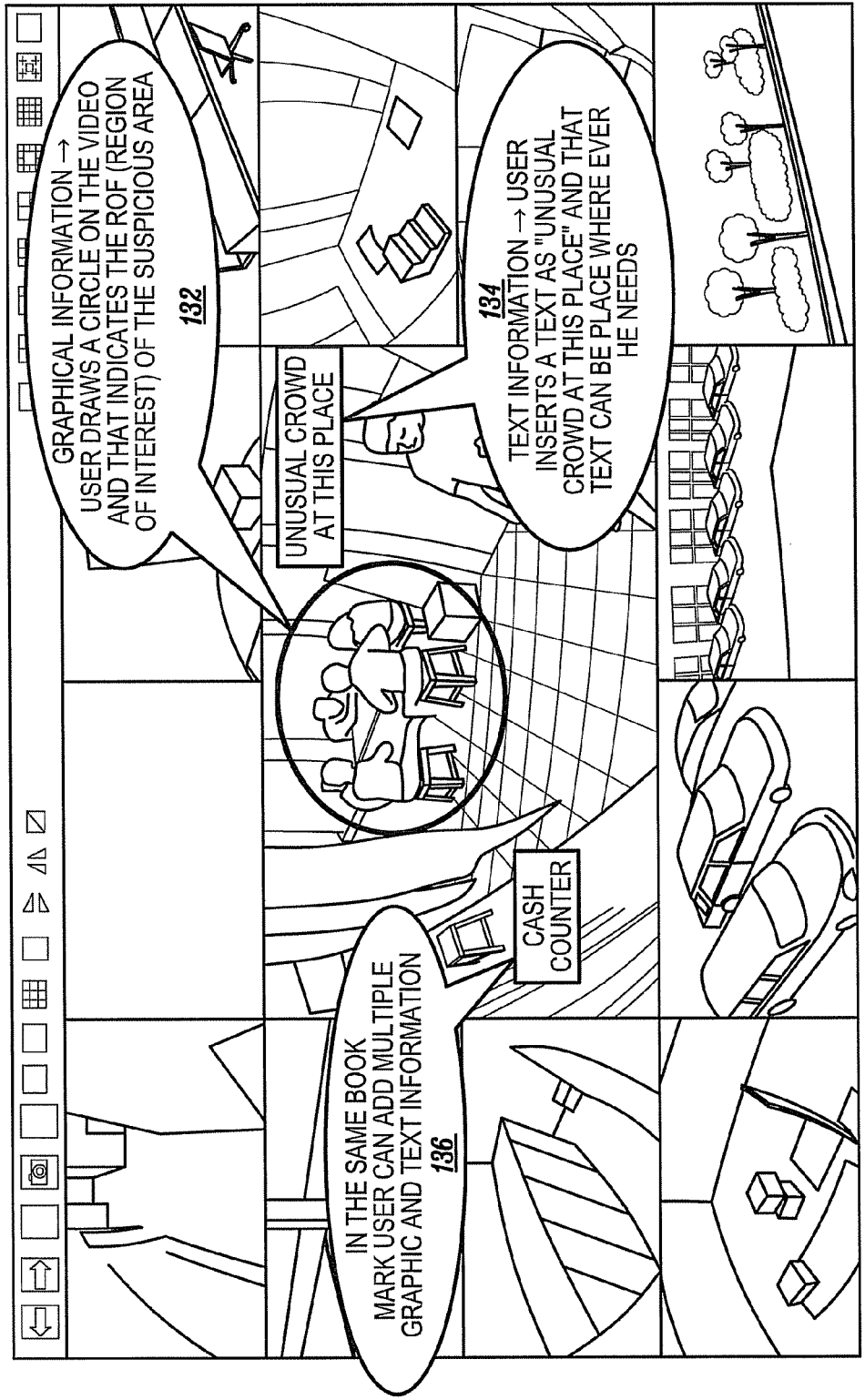
FIG. 5 depicts the primary CCTV operator marking a region of interest in FIG. 4.

FIG. 5 shows the results of a series of steps performed by the CCTV operator. For example, the view may place the stylus on the display 24 and the processor 30 may load 110 a data layer on top of the video. In this case, the CCTV operator may draw a circle around suspicious activity within a region of interest in the video frame as indicated by the balloon labeled 132 in FIG. 5. The CCTV operator may also activate the text processor 36, 38 and enter a description of the suspicious activity as indicated by the balloon labeled 134 in FIG. 5. The user may add other text boxes as reference points as indicated by the balloon labeled 136 in FIG. 5.

Figure 6:
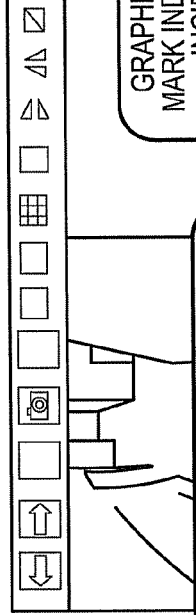
FIG. 6 depicts the CCTV operator adding a text box as further marking of the region of interest of FIG. 4.

FIG. 6 shows a continuation of the example of FIG. 5. In FIG. 6, the view has deleted the circle of FIG. 5 and has added an arrow indicating an activity associated with the activity marked in FIG. 5. In this case, the CCTV operator has added an arrow showing an activity associated with one of the group of people marked in FIG. 5 as indicated by the balloon labeled 138 in FIG. 6. The CCTV operator has also added a text box explaining the meaning of the arrow as indicated by the balloon labeled 142.

In this example, it is assumed that the CCTV operator has alerted his/her supervisor and the supervisor is also viewing the video windows. In this case, the supervisor has marked the video frame with another area of interest as indicated by the balloon labeled 140.

As indicated by FIG. 6, the marking features allow the primary CCTV operator and supervisor to mark up the same one or more video frames from different locations. In this case, the primary CCTV operator and supervisor are able to see markings entered by the other party as well as their own markings.

Figure 7:
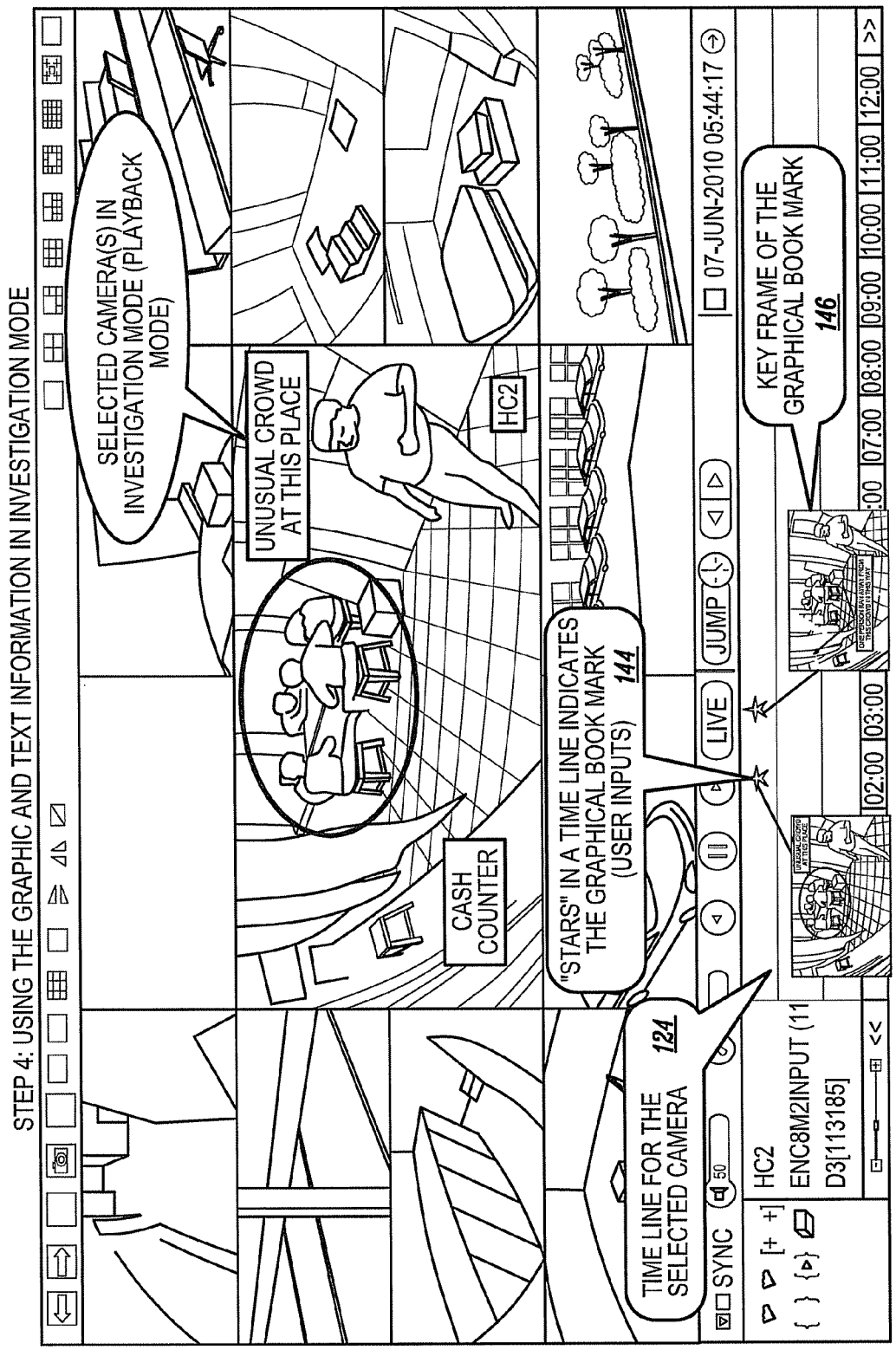
FIG. 7 depicts the identification of temporal locations of markings on the time line shown in FIG. 3.

FIG. 7 shows the activity of FIG. 5 along with the control panel 122. As shown in FIG. 7, each time the primary view (or his/her supervisor) marks up an image a location indicator (e.g., a star) is added to the time line 124 to indicate a location of the marks as indicated by the balloon labeled 144. A key frame of the mark up (shown as a much smaller image) may also be shown on the time line 124 as indicated by the balloon labeled 146.

In general, FIG. 7 shows an image that may be provided for later review. In this case, the primary CCTV operator (or his/her supervisor) has selected the time instant (frame) associated with FIG. 5 from the time line 124. In this way, the primary CCTV operator (or his/her supervisor) may later access files 40, 42 via the display processor in order to review the activity and confirm the suspicious nature of the incident or to look for visual evidence of any crime that may not have been noticed initially.

A specific embodiment of method and apparatus for marking video has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of operating a security system comprising:
providing video of a secured area;
presenting the provided video on a display for a security person monitoring the provided video;
detecting the security person making contact with a surface of the display of the monitored video thereby superimposing markings onto one or more frames of the monitored video through the display of the monitored video;
saving one or more video frames and markings including a set of coordinates of a location of the contact on the display within a set of respective files of a memory device where the video frames occupy a first file of the set of respective files and the markings occupy a second file of the set of files, where the first and second files are different and where the markings are related to the corresponding one or more video frames via a cross reference;
providing a selectable time line with an indicator selecting a time instant of video from the first file; and
reading the second file, correlating the read markings of the second file with the underlying video frames from the first file at the selected time instant and displaying the markings superimposed on the correlated video frames at the respective coordinates.

2. The method of claim 1 wherein the superimposed markings further comprise a line drawn by the security person.

3. The method of claim 1 wherein the superimposed markings further comprise a circle drawn by the security person.

4. The method of claim 1 wherein the superimposed markings further comprise text.

5. The method of claim 1 wherein the saved markings further comprise metadata saved along with the one or more video frames.

6. The method of claim 1 further comprising depicting a time line of the saved video.

7. The method of claim 6 further comprising depicting indicia of the superimposed marking on a corresponding location of the time line.

8. The method of claim 7 further comprising a person selecting a location on the time line and the security system displaying one or more frames of the selected location of video and any superimposed markings associated with the selected location.

9. The method as in claim 1 further comprising a supervisor of the security person superimposing markings onto the one or more frames.

10. The method of claim 9 further comprising adding the markings of the supervisor to a third file of the set of files where the first, second and third files are different and where the markings of the second and third files are related to the corresponding one or more video frames via a cross reference.

11. The method of claim 9 further comprising adding the markings of the supervisor to the second file of the set of files.

12. The method of claim 9 wherein the markings include all geometric shapes, lines, arrow marks, curves and text information.

13. Apparatus comprising:
a security system providing video of a secured area;
a user input with a display that displays the video of the secured area to a security person and that accepts markings from the security person by detecting the security person making contact with a surface of the display;
one or more processors of the security system that superimposes the accepted markings onto one or more frames of the monitored video through the display of the monitored video; and
one or more processors of the security system that saves one or more video frames and markings including a set of coordinates of a location of the contact on the display within a set of respective files of a memory device where the video frames occupy a first file of the set of respective files and the markings occupy a second file of the set of files, where the first and second files are different and where the markings are related to the corresponding one or more video frames via a cross reference;
a selectable time line with an indicator that selects a time instant that identifies video from the first file; and
a display processor that reads the second file correlates the markings with the underlying video frames from the first file at the selected time instant and displays the markings superimposed on the video frames.

14. The apparatus of claim 13 wherein the superimposed markings further comprise a line drawn by the security person.

15. The apparatus of claim 13 wherein the superimposed markings further comprise a circle drawn by the security person.

16. The apparatus of claim 13 wherein the superimposed markings further comprise text.

17. The apparatus of claim 13 wherein the saved markings further comprise metadata saved along with the one or more video frames.

18. The apparatus of claim 13 further comprising depicting a time line of the saved video.

19. The apparatus of claim 18 further comprising depicting indicia of the superimposed marking on a corresponding location of the time line.

20. The apparatus of claim 19 further comprising a person selecting a location on the time line and the security system displaying one or more frames of the selected location of video and any superimposed markings associated with the selected location.

21. Apparatus comprising:
a security system providing video of a secured area;
a user input with a display that displays the video of the secured area to a security person and that accepts markings from the security person via contact by the security person with a surface of the display;
a first processor that superimposes the accepted markings onto one or more frames of the monitored video through a display of the monitored video; and a second processor that saves one or more video frames in a first file of a memory of the security system and the markings including a set of coordinates of the contact on the display within a second file of the memory device where the markings are related to the corresponding one or more video frames via a cross references;

a selectable time line with an indicator that selects a time instant of video from the first file; and a display processor that reads the second file, correlates the markings with the underlying video frames from the first file at the selected time instant and displays the markings superimposed on the video frames.

22. The apparatus as in claim 21 further comprising a time line that displays the one or more video frames in accordance with a time of capture of one or more videos.

23. The apparatus as in claim 22 further comprising a display processor that displays the one or more video frames with superimposed markings based upon selection of a location on the time line.

24. The apparatus as in claim 22 further comprising displaying an indicator of a temporal location of the markings on the time line.

* * * * *